United States Patent [19]
LaDue

[11] Patent Number: 6,144,859
[45] Date of Patent: Nov. 7, 2000

[54] WIRELESS CELLULAR COMMUNICATOR SYSTEM AND APPARATUS

[75] Inventor: Christoph K. LaDue, Soquel, Calif.

[73] Assignee: Aeris Communications, Inc., San Jose, Calif.

[21] Appl. No.: 08/488,839

[22] Filed: Jun. 9, 1995

Related U.S. Application Data

[63] Continuation-in-part of application No. 08/112,476, Aug. 27, 1993, abandoned.

[51] Int. Cl.[7] .............................. H04J 3/12; H04Q 7/00
[52] U.S. Cl. ..................... 455/511; 455/422; 455/419; 455/410; 455/403
[58] Field of Search .................. 379/59, 63, 62, 379/58, 40, 45, 44, 37, 39; 445/67.1, 67.7, 33.1, 54.1; 340/825.34, 825.36, 825.44, 825.54; 342/357, 457, 385, 386; 370/110.1, 110.4, 111, 95.1, 95.3; 455/419, 410, 511, 404, 403, 422

[56] References Cited

U.S. PATENT DOCUMENTS

| | | | |
|---|---|---|---|
| H610 | 3/1989 | Focarile et al. .................... | 455/31.2 |
| 34,496 | 1/1994 | Franklin et al. . | |
| 3,937,892 | 2/1976 | Bloch et al. ....................... | 370/438 |
| 3,976,995 | 8/1976 | Sebestyen . | |
| 4,245,340 | 1/1981 | Landry ............................... | 370/523 |
| 4,254,404 | 3/1981 | White . | |
| 4,375,637 | 3/1983 | Desjardins . | |
| 4,575,621 | 3/1986 | Dreifus . | |
| 4,633,464 | 12/1986 | Anderson ............................ | 370/528 |
| 4,654,867 | 3/1987 | Labedz et al. . | |
| 4,675,656 | 6/1987 | Narcisse . | |
| 4,713,808 | 12/1987 | Gaskill et al. ..................... | 370/314 |
| 4,750,197 | 6/1988 | Denekamp et al. ................ | 379/44 |
| 4,809,316 | 2/1989 | Namekawa ......................... | 379/63 |
| 4,821,309 | 4/1989 | Namekawa ......................... | 379/63 |
| 4,825,457 | 4/1989 | Lebowitz ........................... | 379/40 |
| 4,831,373 | 5/1989 | Hess .................................. | 340/825.03 |
| 4,856,047 | 8/1989 | Saunders . | |

(List continued on next page.)

FOREIGN PATENT DOCUMENTS

WO 95/24791  9/1995  WIPO .

OTHER PUBLICATIONS

J. Samecki, C. Vinodrai, A. Javed, P. O'Kelly, and K. Dick, "Microcell Design Principles", IEEE Communications Magazine, Apr. 1993, pp. 76–82.

IEEE Colloquium on Vehicle Location and Fleet Management 6/8/93, Stewart, J., "Vehicle Location and Position Monitoring System Using Satellite Navigation and Cellular Telephone", pp. 7/1–15.

*Primary Examiner*—Edward L. Coles
*Assistant Examiner*—Cheukfan Lee
*Attorney, Agent, or Firm*—Blakely, Sokoloff, Taylor & Zafman, LLP

[57] ABSTRACT

A wireless cellular communicator system and apparatus for telemetry tracking, surveillance, data transmission, identification, and remote monitoring includes a communicator for data encoding and communication which transmits mobile identification numbers and electronic serial numbers through an existing cellular telephone network. The data is manipulated and encrypted to place any meaning upon it depending upon the type of input apparatus which is utilized. The data is then decoded with a decoder and a comparative data base for monitoring, identification, surveillance, and data transmission. A method of communicating data for telemetry tracking, surveillance, data transmission, identification and remote monitoring is also provided, comprising, communicating decimal, binary and hexidecimal data through a communicator, transmitting the decimal, binary and hexidecimal data via cellular modulation utilizing a cellular telephone network, and decoding the data with a decoder situated at a monitoring station where the data is decoded and manipulated for monitoring, identification, surveillance, and data transmission.

13 Claims, 6 Drawing Sheets

U.S. PATENT DOCUMENTS

| | | | |
|---|---|---|---|
| 4,860,341 | 8/1989 | D'Avello et al. . | |
| 4,866,422 | 9/1989 | Dunnett et al. . | |
| 4,868,859 | 9/1989 | Sheffer | 379/39 |
| 4,905,271 | 2/1990 | Namekawa | 379/63 |
| 4,924,211 | 5/1990 | Davies . | |
| 4,965,820 | 10/1990 | Sharpe et al. . | |
| 4,993,059 | 2/1991 | Smith et al. | 379/39 |
| 5,005,014 | 4/1991 | Jasinski | 340/825.44 |
| 5,023,901 | 6/1991 | Sloan et al. . | |
| 5,027,383 | 6/1991 | Sheffer | 379/39 |
| 5,030,940 | 7/1991 | Siikarla . | |
| 5,048,015 | 9/1991 | Zilberfarb | 370/312 |
| 5,055,851 | 10/1991 | Sheffer . | |
| 5,077,830 | 12/1991 | Mallia | 455/38.1 |
| 5,093,927 | 3/1992 | Shanley | 379/63 |
| 5,113,427 | 5/1992 | Ryoichi . | |
| 5,119,397 | 6/1992 | Dahlin et al. . | |
| 5,122,959 | 6/1992 | Nathanson et al. . | |
| 5,128,979 | 7/1992 | Reich et al. | 379/39 |
| 5,153,582 | 10/1992 | Davis | 340/825.44 |
| 5,153,903 | 10/1992 | Eastmond et al. | 455/458 |
| 5,155,689 | 10/1992 | Wortham . | |
| 5,170,426 | 12/1992 | D'Alessio et al. . | |
| 5,204,670 | 4/1993 | Stinton . | |
| 5,212,636 | 5/1993 | Nakazawa . | |
| 5,235,598 | 8/1993 | Sasuta | 370/327 |
| 5,239,294 | 8/1993 | Flanders et al. | 340/825.34 |
| 5,239,678 | 8/1993 | Grube et al. | 455/34.1 |
| 5,239,680 | 8/1993 | Grube et al. | 379/63 |
| 5,241,598 | 8/1993 | Raith | 379/59 |
| 5,247,564 | 9/1993 | Zicker | 379/39 |
| 5,255,306 | 10/1993 | Melton et al. | 379/39 |
| 5,274,368 | 12/1993 | Breenen et al. | 379/63 |
| 5,276,728 | 1/1994 | Pagliaroli . | |
| 5,280,426 | 1/1994 | Edmonds . | |
| 5,295,178 | 3/1994 | Nickel et al. | 379/58 |
| 5,307,509 | 4/1994 | Michalon et al. | 455/54.1 |
| 5,325,419 | 6/1994 | Connolly et al. . | |
| 5,327,478 | 7/1994 | Lebowitz | 379/40 |
| 5,335,278 | 8/1994 | Matchett et al. | 379/63 |
| 5,337,345 | 8/1994 | Casidy et al. | 379/62 |
| 5,341,410 | 8/1994 | Aron et al. | 455/410 |
| 5,343,493 | 8/1994 | Karimullah | 455/54.1 |
| 5,355,511 | 10/1994 | Hatano et al. . | |
| 5,357,254 | 10/1994 | Kah, Jr. . | |
| 5,359,182 | 10/1994 | Schilling . | |
| 5,365,516 | 11/1994 | Jandrell . | |
| 5,377,193 | 12/1994 | Grube et al. | 370/315 |
| 5,392,451 | 2/1995 | Schwendeman . | |
| 5,396,539 | 3/1995 | Slekys et al. . | |
| 5,396,653 | 3/1995 | Kivari et al. . | |
| 5,400,018 | 3/1995 | Scholl et al. . | |
| 5,404,355 | 4/1995 | Raith . | |
| 5,410,737 | 4/1995 | Jones | 455/56.1 |
| 5,420,911 | 5/1995 | Dahlin et al. | 455/553 |
| 5,422,626 | 6/1995 | Fish . | |
| 5,432,495 | 7/1995 | Tompkins | 379/37 |
| 5,432,841 | 7/1995 | Rimer | 379/59 |
| 5,446,759 | 8/1995 | Campana, Jr. . | |
| 5,448,760 | 9/1995 | Frederick | 379/62 |
| 5,448,773 | 9/1995 | McBurney et al. . | |
| 5,465,387 | 11/1995 | Mukherjee | 379/62 |
| 5,473,667 | 12/1995 | Neustein . | |
| 5,483,465 | 1/1996 | Grude et al. | 455/33.1 |
| 5,497,412 | 3/1996 | Lannen et al. . | |
| 5,513,183 | 4/1996 | Kay et al. . | |
| 5,525,967 | 6/1996 | Azizi et al. . | |
| 5,525,969 | 6/1996 | Ladue . | |
| 5,526,357 | 6/1996 | Jandrell . | |
| 5,537,102 | 7/1996 | Pinnow . | |
| 5,539,810 | 7/1996 | Kennedy, III et al. | 379/89 |
| 5,544,225 | 8/1996 | Kennedy, III et al. | 455/412 |
| 5,546,444 | 8/1996 | Roach, Jr. et al. . | |
| 5,556,102 | 9/1996 | Huang . | |
| 5,559,312 | 9/1996 | Lucero . | |
| 5,563,931 | 10/1996 | Bishop et al. . | |
| 5,566,236 | 10/1996 | Melampy et al. . | |
| 5,568,119 | 10/1996 | Schipper et al. . | |
| 5,569,083 | 10/1996 | Fioretti . | |
| 5,573,244 | 11/1996 | Mindes . | |
| 5,592,535 | 1/1997 | Klotz . | |
| 5,594,740 | 1/1997 | Ladue . | |
| 5,610,969 | 3/1997 | McHenry et al. . | |
| 5,611,730 | 3/1997 | Weiss . | |
| 5,664,005 | 9/1997 | Emery et al. . | |

WIRELESS CELLULAR COMMUNICATOR SYSTEM AND APPARATUS

RELATED APPLICATIONS

This is a continuation-in-part of Ser. No. 08/112,476 filed Aug. 27, 1993, now abandoned.

BACKGROUND OF THE INVENTION

1. Field of Invention

This invention relates to communicator devices and data transfer systems, and more particularly to communicator devices and data transfer systems for security system monitoring, remote wireless surveillance, data transmission, and the like, for commercial, residential, and vehicular uses.

2. Description of the Related Art

The present invention relates to communicator devices and data transfer systems, and in particular to communicator devices and data transfer systems useful in commercial, residential, and vehicular security system remote monitoring applications. However, in its broader applications, the wireless communicator of the present invention may be applied to any remote mobile or stationary application specific device that requires data transfer and monitoring.

Most prior art communicator devices or security panels that transmit security system status data have been developed based on the use of land based copper wire telephone networks. Such devices and systems are used to transmit data and communicate particular information, for example, the presence of an intruder inside the confines of a business or a residence. Once a peripheral device such as a door magnetic contact or a passive infrared device detects the presence of an unauthorized intruder, it sends status information to the security panel which transmits the data to a central processing unit.

Such peripheral devices are connected to the security panel either by copper wires or by a designated short-range radio frequency. Once the security panel receives this data, it forwards such reporting data to a remote central monitoring station over a land based telephone line.

All such prior security system monitoring devices and communicators suffer significant problems, which have limited their ability to provide truly secure, reliable, and accurate data transfer. In fact, such limitations apply generally to prior communicator systems and remote data transfer devices. Further, in prior wireless security system cellular transceivers, the high cost of system hardware and voice-data based cellular service subscription have severely inhibited widespread use of such wireless security system data transmission panels, as well as limiting their application. Such limitations create many problems and have significantly limited the range and diversity of applications for such prior systems and devices. For example, a serious limitation inherent in prior land based systems and devices is the ability of a thief to simply cut the telephone line before attempting to break into a building. Once the telephone line is cut, communication to the central monitoring station for private security and subsequent police response is impossible.

Another significant limitation inherent for prior cellular security transmitters and communicators is cost. It is not unusual for a cellular security transceiver to cost from five hundred to one thousand dollars. Subscribing to a cellular service with current technology is also expensive. Cellular air time costs roughly forty cents a minute, plus the minimum monthly service connect charge is usually forty-five to sixty-five dollars a month. Generally current security systems cost about five hundred to six hundred dollars for the associated hardware, including all door and window contacts, keypads, and passive infrared devices. These estimated costs are based on a typical two to three thousand square foot home or business. Very few people or businesses are willing to pay an extra five hundred to one thousand dollars for cellular security hardware, plus service charges, plus the cost of the security system hardware, and the labor costs for installation.

Accordingly, it is the primary object of this invention to provide an improved means of transmitting application specific data over cellular. The present invention provides the means and method for communicating application data directly over cellular control channels, directly bypassing conventional voice traffic channels. This innovative approach provides a wireless communicator system for data monitoring and communication for use in commercial, residential and vehicular applications. The present invention is inexpensive to manufacture and install, and is very secure, reliable, durable, and tamper proof. It is highly suitable for security system and monitoring applications, but is also readily adaptable to a wide variety of data transfer and remote communication applications.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a communicator system and apparatus for telemetry tracking, surveillance, data transmission, identification and remote monitoring, comprising: means for communicating data packets through a cellular telephone network via control channels without disrupting said cellular telephone network operations; means for manipulating data transferred from a cellular communicator through said means; cellular control channels, for communicating application specific data, so that said data may be communicatively decoded in the cellular telephone and transferred into a cellular network; and decoding means situated at a monitoring station whereby said data is decoded and manipulated for monitoring, identification, surveillance, and data transmission.

The communicator means preferably includes at least one decoder including a transmitter for transmitting a standard but modified 48 bit RECC reverse control channel A word that contains mobile identification numbers, a modified RECC control channel C word that contains electronic serial numbers, and a special application specific data RECC control channel H word. Means for manipulating and processing data preferably comprises a decoder and a comparative data base. The decoding and data processing means preferably comprises a remotely located central monitoring data decoding and data management system.

In one preferred embodiment, a communicator panel means is provided by a panel means having standard security panel components that monitor multiple security zones inside buildings and motor vehicles. Such panel means detect unauthorized entrance or theft attempts by responding to open or closed relays connected to the panel means including sensors sensitive to passive infrared motion, normally closed or normally opened magnetic contacts, audible glass break sensors, field effects sensors, shock sensors, microwave sensors, remote wireless panic button type sensors, heat and fire detection sensors, level detection sensors, and other detection means. Cellular transceiver means are integrated with the panel means allowing transmittal and receiving of application specific data information through the cellular data only FSK modulated 10 Kbps Reverse Control Channel (RECC) and Forward Control Channel (FOCC) control channel signalling systems, paging systems, satellite systems and a designated central monitoring station is operably linked to a mobile telephone switching office MTSO via preferably public switch telephone network (PSTN), that utilizes various data transfer communications standards and protocols that can include a 9600 bits per second based protocol, Integrated Services Digital Network (ISDN) protocols, Signalling System Seven (SS7), and T1 protocols that can support various data rates and handshake patterns. Application specific data is transmitted from the communicator apparatus on the RECC reverse control channels of any cellular network to the central monitoring station which decodes the data and information, evaluates the data, and, as a result of the data evaluation, transmits further data to other remote locations depending upon the particular data evaluation, and then such data is stored for further evaluation and record maintenance.

Preferably the specific data information utilized for application specific purposes can be derived from any cellular, PCS, and GSM control channel standard. One preferred control channel standard utilizes a 48 bit standardized word, and multi-48 bit word string. This particular control channel is utilized by almost all North American Cellular Carriers, and many international cellular carriers and is called the RECC FSK reverse control channel. This same type of control channel configuration is utilized by the Total Access Communication System (TACS) utilized around the world.

This RECC reverse control channel is based on wideband FSK modulation, with 8-kHz peak deviation with a bit rate of 10 Kilo bits a second, utilizing 48 bit words that contain 36 information bits and 12 bits for parity. The RECC protocol causes the 48 bit word to be transmitted five times for a cyclic redundancy rate (CRC) of five. This process is executed to insure data error correction. The RECC protocol allows for up to eight 48 bit words to be transmitted at one time, in one complete string, factoring in CRC for a total of 1920 bits. These eight 48 bit words are designated A through H. The A word contains the Mobile Identification Number (MIN). The MIN number is a 10 digit telephone number. The present invention can manipulate the 36 information bits of any of these 48 bits words. Primarily, the MIN number contained in the A word, and the information bits in the H word are utilized for the purpose of manipulation, encoding and decoding application specific information. This manipulated standardized data becomes application specific data, that creates a unique status and action command language base. This unique language is used to communicate with and remotely control application specific devices such as security systems, motor vehicle anti-theft systems, fleet management systems, home arrest systems, two way paging systems, gambling systems, video games, and any other remote communicator or remote sensor device. This manipulated data contained in these 48 bit words is initially manipulated and encoded at the communicator means transmission source, transmitted to a cellular transmission tower and base station, relayed from the tower and base station to mobile switching center (MSC), and then forwarded to the central monitoring station by the public switched telephone network (PSTN).

In accordance with the present invention there is also provided a method for communicating data for telemetry tracking, surveillance, and data that contains application specific device status information for identification and remote monitoring, comprising: communicating decimal, binary, and hexidecimal data in various data word formats, control channel protocols and control channel modulation schemes through a communicator means; transmitting said decimal, binary, and hexidecimal data contained within standard control channel data words that are carried within certain definable control channel protocols and modulation schemes utilizing a cellular telephone network that operates with various designated frequencies, outlined in Interim Standards IS-553, IS-54B, IS-136, IS-95, IS-104 and GSM as published by the Telephone Industry Association (TIA) and sanctioned by the Federal Communications Commission (FCC), and the European Telephone System (ETS). The aforementioned data is transmitted from the communicator means, to a cellular transmission and reception tower, via control channels, relayed to a mobile switching center and re-routed to a central monitoring station whereby said data is decoded and manipulated for monitoring, identification, surveillance, and data transmission. Conversely, the central monitoring station (CMS) sends data instructions to the communication via the paging network. In one example the communicator contains a paging receiver and or a satellite receiver means for receiving messages from a standard paging and or satellite network network. In this way the user can receive normal numeric and alpha-numeric messages from multiple sources. Additionally the communicator can be instructed to perform various operational routines as a result of receiving specially coded data message instructions from the central monitoring station (CMS) by way of paging and satellite networks.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE PREFERRED EMBODIMENTS

Reference will now be made in detail to the present preferred embodiments of the invention as illustrated in the accompanying drawings.

In accordance with the present invention a communications system and communicator apparatus for tracking, fleet management, motor vehicle anti-theft, personnel management, surveillance, data transmission, identification, message acknowledgement, and remote monitoring applications is provided, comprising: means for communicating data through a cellular telephone network's control channels without disrupting said cellular telephone network normal voice traffic operations; means for manipulating data transferred through said means for communicating data, so that data may be communicatively decoded and transferred; and decoding means situated at a central monitoring station whereby said data is decoded and manipulated for monitoring, identification, data distribution, surveillance, data management, and data transmission of action data commands and communicator status reports to and from facilitators and end users.

The communicator system and apparatus of the present invention also provides a method for telemetry tracking, surveillance applications, identification, data transmission determining security status of buildings and motor vehicles, and other data transmission and remote monitoring, comprising: communicating decimal, binary and hexidecimal data through a communicator means, said data being encoded within a circuitry of said communicator, transmitting said data via various modulation and data management schemes utilizing control channels that are part of a cellular telephone network, these control channels are also called access channels, digital control channels, signalling channels, fast associated control channels, slow associated control channels, that are utilized in various cellular telephone network operations schemes, decoding said data with decoding means situated at a central monitoring station whereby said data is decoded, routed, distributed, relayed, and manipulated for monitoring, identification, surveillance, system management, communicator status, and other data handling. The primary object of this invention is to utilize standard and currently operational and soon-to-be operational; control channel data protocols, data rates, access schemes, word block formats, that are expressed in various modulation schemes such as; frequency shift keying (FSK), Quadrature Phase Shift Keying (QPSK), offset-quadrature phase shift keying (OQPSK), frequency-division multiplexing (FDM), time-division multiplex access (TDMA), code-division multiple access (CDMA), in means and methods that utilize standard but content altered data for the purpose of application specific data transmission management and application specific wireless communicator means with fully integrated device control. Furthermore, said application specific communicator and fully integrated application device is subject to remote status monitoring via a specially configured Central Monitoring Station (CMS). Furthermore this central monitoring station is designed to transmit data that directly controls said application specific communicators and application specific devices via terrestrial paging networks that control terrestrial transmission base stations and transmission towers, satellite networks that control space bound geosynchronous satellites, and space bound High Earth Orbit (HEO), Medium Earth Orbit (MEO), and Low Earth Orbit (LEO) satellites.

The central monitoring station transmits action data commands to application specific communicators that are fully integrated with application specific devices via TI/PSTN lease lines to paging and satellite network control centers, that in turn relay these action data commands to the aforementioned paging transmission base stations and towers and satellites, that in turn transmit action data words to the application specific communicators and fully integrated application specific devices. Once these action data words are received, the application device is caused to change its operational status, or report its current operational status, form the content altered but standardized data word and transmit said content altered word and multi-word string to the cellular telephone network, the data management circle is completed by relaying said standardized but content altered control channel data back to the central monitoring station (CMS).

The term cellular telephone network is a broad based term that encompasses a wide range of different analog and digital cellular communications standards. Such standards as AMPS Cellular, NAMPS Cellular, DAMPS Cellular, Personal Communications Standards (PCS), both broadband and narrowband, TACS, JTACS, ETACS, and Global Special Mobile (GSM). All of these standards are fully described in such documents as Interim Standards IS-553, IS-54(ABC), IS-95, IS-136, IS-104, European Telephone Standard (ETS) standards, and others.

In specific reference to FIGS. 1–6, the following numerals correspond throughout the figures to the following designated structures and data:

28. Control channel application data (CCAD) communicator.
29. Paging Network Control center (PNC).
31. Cell site.
32. Mobile Switching Center (MSC).
34. T1 data link carrier contains 24 channels TDM, each frame=(24*8 bit words)+1 framing bit=193 bits. The gross bit rate is 193*8000=1.544 MBPS.
35. Dedicated voice circuits.
36. Modem LAN link.
37. Central Monitoring Station.
38. Data Reception and Distribution terminal.
39. Modified 48 bit RECC word string.
40. Decoder Terminal (DEC).
41. Comparative Data Base (CDB).
42. Internal LAN communications link.
43. Action Data Base (ADB).
44. T1 PSTN.
45. Cell Site Sector antenna.
46. Stationary Base Station.
47. Office of Data Production (ODP).
48. Modem Bay.
49. Capcode.
50. Text-alpha message.
51. Command message.
52. Inmarsat P (L-Band Satellite).
53. Electronic Serial Number ESN contained in C word.
54. Security system Central Processing Unit (CPU).
55. Encoded Data Stream contained in an A word.
56. Communicator antenna.
57. Sensor contact conductors.
58. Security Panel relays.
60. Magnetic reed sensor contact.
61. Magnet.
62. Typical door.
63. Address and Data Bus.
64. Cellular data transceiver.
65. Cellular transceiver CPU.
67. Navstar Global Positioning Satellite GPS.
68. Facilitator/end user FAC.
69. H word.
71. Mini dax router.
72. Data switch Unit.
73. Base Site Controller (BSC).

75. Main communicator board.
76. C word ESN serial number code breakdown.
77. H Word decoded data breakdown.
78. Paging Transmission Tower.
79. Security panel relays and sensors.
83. Normally transmitted MIN, designated for billing and cellular system security.
84. Stationary building.
85. Mobile installation.
86. Abbreviated address A word; Mobile Identification Number (MIN).
87. Cellular Telephone Network.
89. H word digit field.
90. D4 channel bank.
91. Satellite action command message.
92. Communicator component multi-conductors.
93. Type of zone.
94. Transmitted paging and/or satellite signal.
95. Paging Receiver.
96. Inmarsat P satellite receiver.
97. Application Identification Digits/bit.
98. B word extended address.
99. GPS receiver.
100. Number of Additional Words Coming (NAWC) field.
101. Order Qualification code.
102. Application specific order code.
103. Station Class Mark, CCAD communicator.
104. H word block format.
105. Thirty six information bits expressed in binary code.
106. Panic silent/audible indicator.
107. Zone number.
108. SCM station class mark.
109. Digital switch unit.
110. GPS antenna.
111. Paging receiver switch.
113. LED screen.

Figure 1:
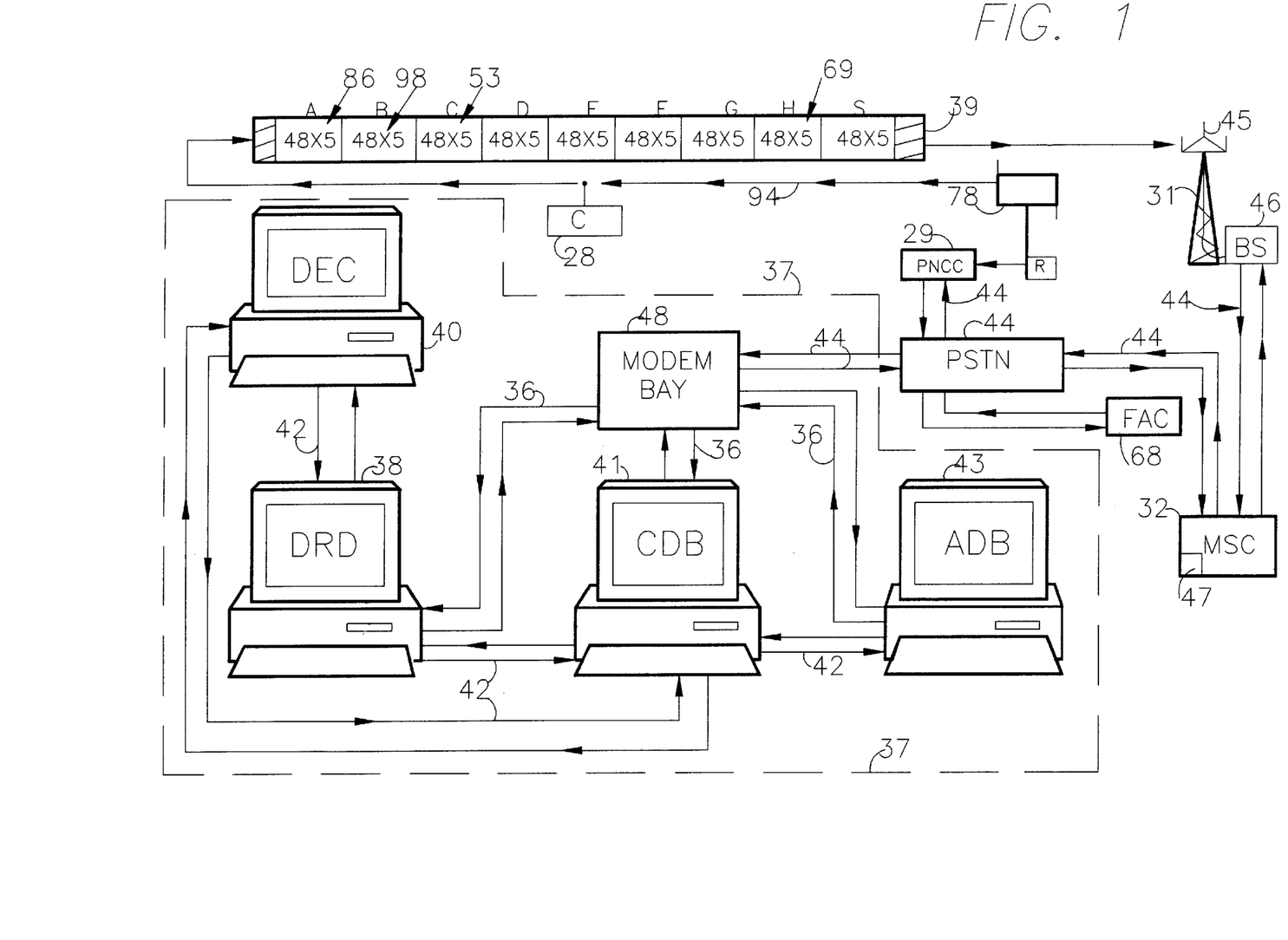
FIG. 1 is a block diagram illustrating the system data transmission logic flow of the present invention, according to the invention.
Figure 2:
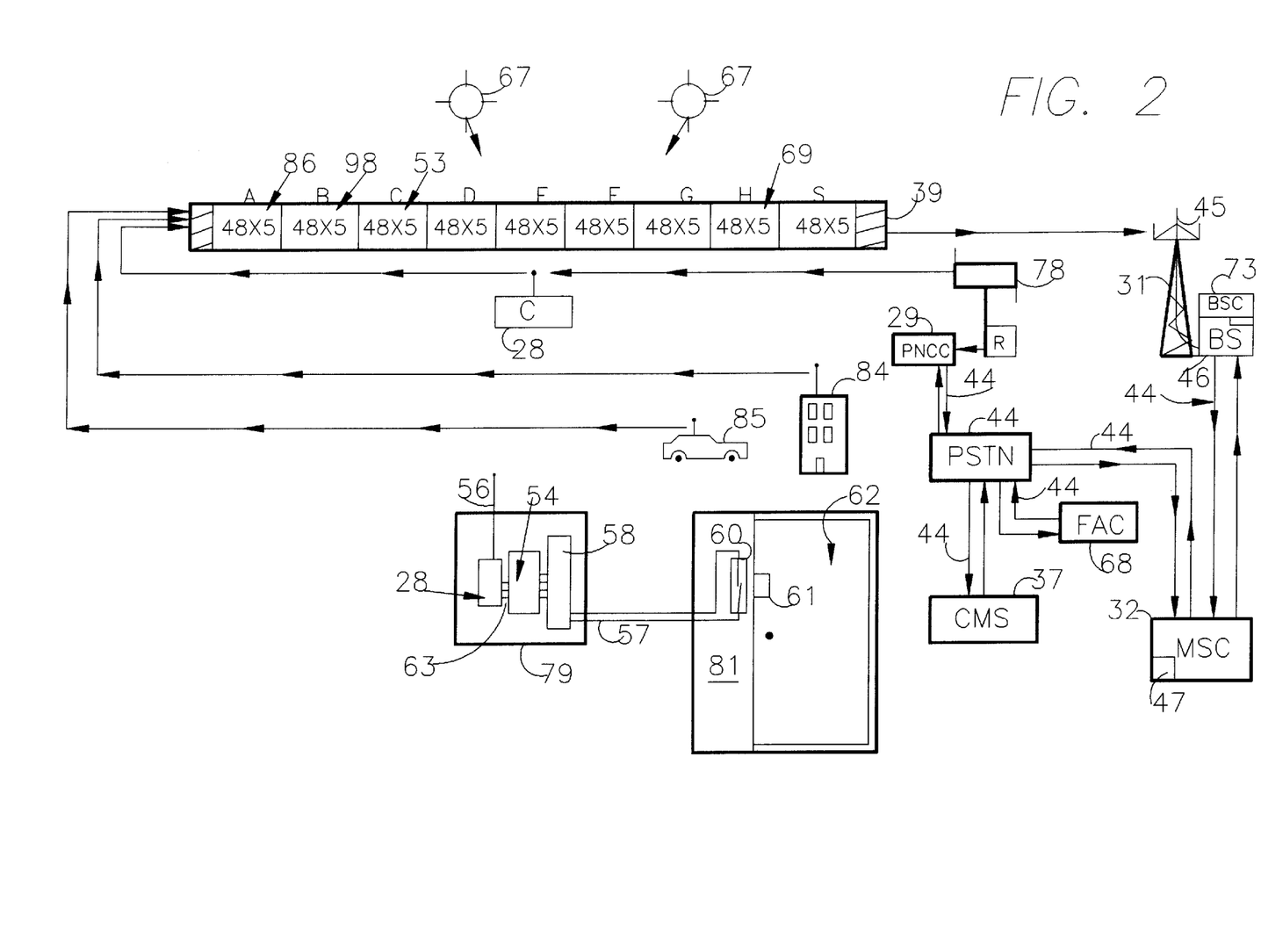
FIG. 2 is a logic flow schematic of the security panel means of an embodiment of the invention, according to the invention.

In FIG. 1 a logic flow diagram of a preferred embodiment of the invention shown. Communicator means preferably-comprise communicator 28 which includes both circuitry and software means for encoding-decoding specific A word MIN data, and H word application specific data. Communicator 28 transmits such data to a cellular tower 31, as shown in FIGS. 1 and 2. The signal transmitted from communicator 28 is a standard but content altered RECC multi 48 bit word data string 39 as shown in FIG. 1 and FIG. 2. The modified 48 bit RECC multi word string 39 that is transmitted from the communicator 28 is received by the sector antenna and Base Station 46.

Figure 5:
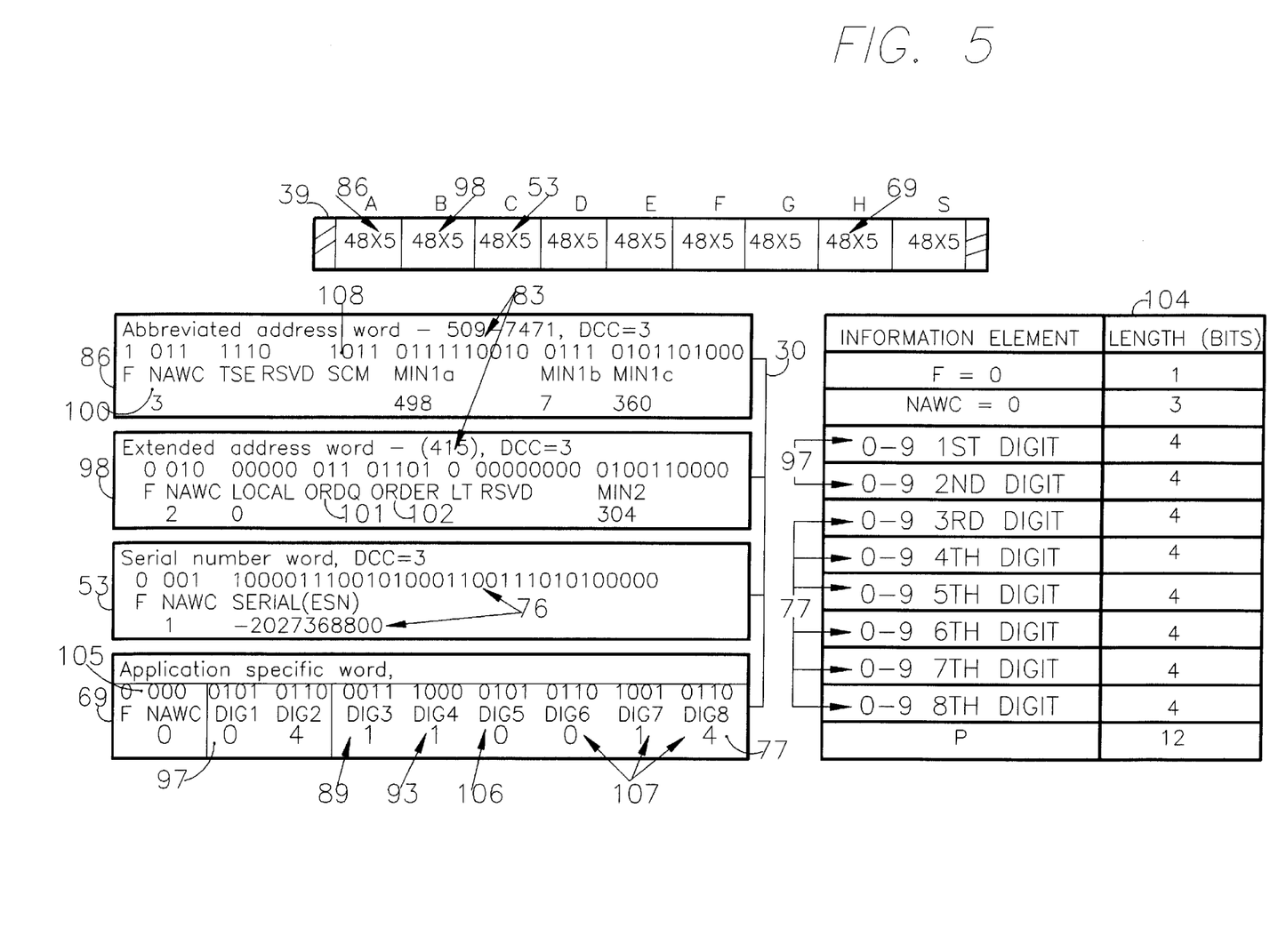
FIG. 5 is an illustration of interpretation of decoded A word, B word, H word and electronic serial number (ESN) data breakdown contained in the C word, according to the invention.

The Base Station 46 preferably relays modified RECC reverse control channel data 39 transmitted from communicator 28 to a Mobile Switching Center (MSC) 32 via a T1 data link 44. As the modified RECC data is processed through the T1 output of the Office of Data Production (ODP) 47, it is then relayed via the PSTN 44 in the form of T1/DSO data protocol to the central monitoring station (CMS) 37. Referring to FIG. 1 and FIG. 2, the data arrives from the PSTN 44 at the modem bay 48. Then the data is sent to the data reception and distribution terminal (DRD) 38. When the data reception and distribution terminal (DRD) 38 receives the application specific data, its software reads the entire application specific data string and immediately duplicates the string, and simultaneously sends one string to the comparatve data base terminal (CBD) 41, and an exact duplicate to the decoder terminal (DEC) 40. The decoder terminal reads the H word 69 as depicted in FIG. 1, FIG. 2, and FIG. 5. In FIG. 5 the decoder terminal software reads the H word 69, digit 1, and digit 2, 97 to determine which application the multiword string and contained A word 86, B word 98, C word 53, and H word belongs to. Referring to FIG. 5, the H word is expressed here in two format versions. This particular word format 104 depicts the H word in word block configuration that clearly shows each of the information fields are expressed in digit form zero through nine. Digit 1 and digit 2, 97 illustrates how these two fields are used to indicate to the central monitoring station's decoder terminal software to determine which application use this H word belongs too. These two fields allow for application information field variability of 00 to 99, these fields will allow for up to ninety nine different applications. A,B,C, and H words are expressed in a descriptive format 30 in FIG. 5, for the purpose illustrating how each data field is utilized. The H word 69 depicts the application specific word that carries variable application specific information expressed in digits 77 and 97. Referring to H word block 104, Each digit field equals four bits of information expressed in zeros and ones, for example; 0=0000, 1=0001, 2=0010, 3=0011, 4=0100, 5=0101, 6=0110, 7=0111, 8=1000, and 9=1001. For example as expressed in the application specific word, the first two digits allow for a variability of zero to nine in each field. The current application, which is a security system, equates to 0 in the first digit field 97, and 4 in the second digit field. The code 04 indicates to the decoder terminal software that in fact the application is a stationary security system application. The decoder terminal also determines the status of the application.

Referring to FIG. 5, the H word 69 and H word block 104 shows the thirty-six information bits expressed in binary form 105, and depicts the position of each application information digit 97 and 77. Each digit indicates specific status information. Since code 04, 97 indicates that this particular application is a stationary security system application, the other information digits also relate to that security system status. For example, digit 3, 89 indicates if the security system is in; 1=alarm mode or 0=normal mode, digit 4, 93 indicates type zone, 0=interior, 1=exterior, digit 5, 106 indicates panic zone, 0=no panic alarm, 1=panic in silent mode, 3=panic with audible alarm, and digits 6,7, and 8, 107 indicate which zones are monitoring the status of a building, and which zones have been engressed. 014 indicates that zone fourteen has been engressed. The last three digits allow for up to 999 separate zones. Most security systems on the market today allow for only 128. The decoder terminal 40 as shown in FIG. 1, determines the specific application, and the status of this particular user, and sends this information to the comparative data base terminal 41. The comparative data base terminal 41 has already received a duplicate string of the data. While the decoder terminal 40 was determining application identification and status, the comparative data base terminal 41 determines which operating cellular system the data originated from and the application specific facilitator of the received data string. The comparative data base terminal 41 also keeps track of each application specific data string. Each time a string is sent to the central monitoring station, the comparative data base counts each received data string as a transaction. Each data string is actually a data packet, that is counted. Each data packet transaction is deemed by the comparative data base terminal 41 as a billed event. The present invention provides for very accurate data packet transaction event tracking. The application specific facilitator, in this case a security company, only pays for each data packet transaction received at the central monitoring station and recorded. The comparative data base terminal 41 acts primarily as a data packet transaction record keeper and interfaces with other billing equipment utilized by third party billing companies whom specialize in direct billing of facilitators and end users of cellular, paging and satellite services.

The present invention also provides for sending transmitted commands to each integrated application specific communicator and device. Referring to FIG. 1, the facilitator 68 sends an action command message request (ACM request) to the CMS 37 via the PSTN T1 44 to the modem bay 48, the data reception and distribution terminal 38 (DRD) relays the ACM request to the comparative data base terminal 41 (CDB) which determines the authenticity and status of the ACM request, and the facilitator whom sent the request. Once these parameters are achieved action data base terminal 43 interacts with the comparative data base terminal 41. The comparative data base terminal 41 examines the status condition, and the preset status parameters of a particular application. If the status condition warrants some sort of action to be taken by the facilitator 68, the comparative data base 41 sends an action command order to the action data base terminal 43. The action data base terminal 43 determines which communications pathway the facilitator is interfaced with, be it a paging network, satellite network, or other wireless communications network pathway. The central monitoring station's action data base terminal 41 sends the action command to the paging network control center 29 via the PSTN T1 44.

Figure 4:
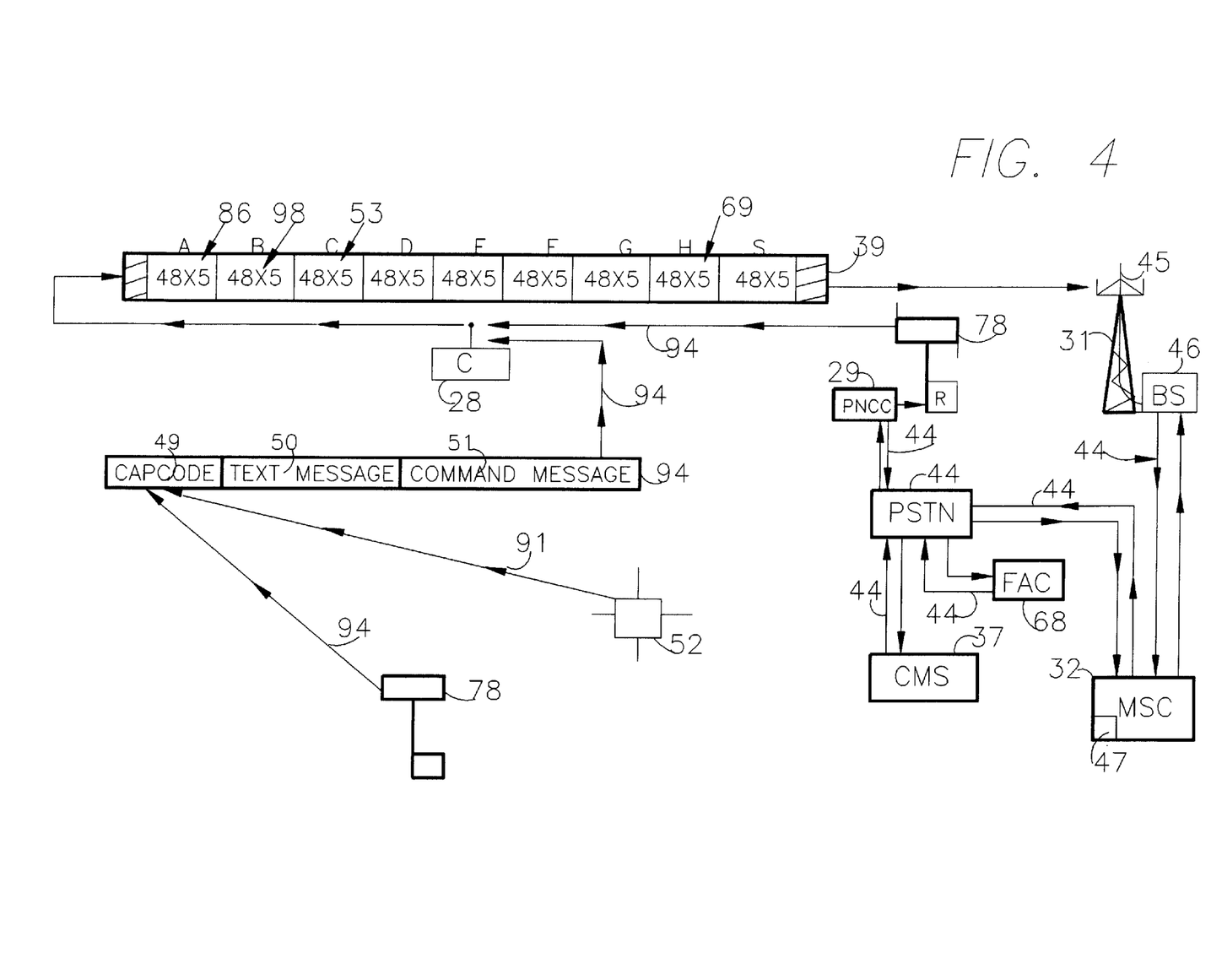
FIG. 4 is a schematic illustration of a data flow showing an example of transmitted encoded data and received modified decoded A word MIN number data, B word and H word data, and paging transmitted signal, according to the invention.

Referring to FIG. 4, the paging company preferablythen sends out the action command message 51 along with other normally transmitted by a paging company, such as a capcode 49 and another text message 50. The mobile communicator 28 can have a fully integrated paging receiver for receiving action commands, text messages, broadcast messages, specially coded messages and other types of data messages. By combining a paging network, and or a satellite network such as the INMARSAT P standard can provide the means of sending messages to the communicator 28. The present invention is a fully self contained data communications system that is created by simply utilizing two or more fully operational systems such as cellular telephone and one way paging, and or satellite system. The present invention is defined as a control channel application data (CCAD) system, that sends application data on normal cellular telephone control channels in a unique, efficient, highly cost effective way, that does not disrupt, cause capacity problems to the host cellular system.

The present invention creates a new wireless communications paradigm that merges existing communications technologies, for the expressed purpose of providing advanced applications for the end user, at a very low cost. The advantages for the cellular carrier, the paging network provider and the satellite system operator are dramatic. The present invention's technology can be applied to these networks without changing or adding substantial infrastructure hardware or software. Costs are low and revenues are quite high. The cellular carrier does not have to invest in millions of dollars of system infrastructure add-ons and upgrades, as is the case with other technologies such as Cellular Digital Packet Data CDPA. In fact the present invention can be adapted to a cellular network's CDPD infrastructure platform, various anti-fraud system platforms such as Cellular Technical Services "Blackbird," Stealth Cellular's "Jammer," and other communications platforms.

The present invention does not require expensive end user communicators, for it utilizes a standard cellular telephone mobile communicator with modified software and firmware, plus added components such as paging receivers, global positioning system receivers, and satellite receivers. The present invention's end user equipment is an amalgamation of a cellular telephone transceiver with or without voice capability that is integrated with a security system, a motor vehicle fleet tracking system, an auto anti theft system, a home arrest system, remote sensors applications, child protection, court sanctioned keep-aways, and many other types of similar applications. Furthermore, the present invention operates normally with the host cellular systems control channels, and simply utilizes the host cellular system's standard data protocols and formats, while only altering the content of certain data fields contained within various data word formats, that are presently utilized in various modulation schemes.

In FIG. 2, application specific communicators 28 are represented as an integrated part of security system applications that are applied and operating in the structure of a commercial building 84, and a motor vehicle 85.

Referring to FIG. 2, inside a building application each door and window is protected from intrusions by security contacts. Many different types of security contacts are available in the market place. Most security contacts come in two classes; magnetic reed sensors, and passive infrared types. Magnetic reed sensors only cover a door or window, note the inside of a building structure. Depicted here is a typical door 62. Attached to the door is a magnet 61. Attached to the door jamb 81 is an enclosed magnetically sensitive reed. As depicted here, when the door is closed the magnet is positioned right next to the reed sensor 60 which is open. When the security system is armed, as long as the door remains closed the circuit remains open. When the door is opened, the magnetic field that is produced by the magnet disappears. Once the field is no longer present the flexible metal reeds touch and the circuit is closed. Assuming that the security is aimed, the security panel 79 contains a series of relays 58 that close, the central processing unit 54 detects the closures, and sends the status bits to the communicator 28, that in turn creates the H word 69 status data information field. Referring to FIG. 5, the H word 69 data field registers 89, 93, 97, 106, and 107 are created, the communicator transmits an auto registration reverse control channel (RECC) multi word string 39, that contains the A word 86, the B word 98, the C word 53 and other possible words to the cellular site sector antenna 45.

Referring to FIG. 2, from the sector antenna 45, the radio frequency (RF) FSK modulated signal that contains the RECC multiword data string is preferablysent to the base station 46. Specially modified base site controller software, that is designed to recognize the H word, converts the RECC multiword data string 39, from air-interface protocol to landline eight bit T1 word DSO protocol, by the base site controller (BSC) 73 and sent to the mobile switching center (MSC) 32 via the PSTN T1 44.

Figure 6:
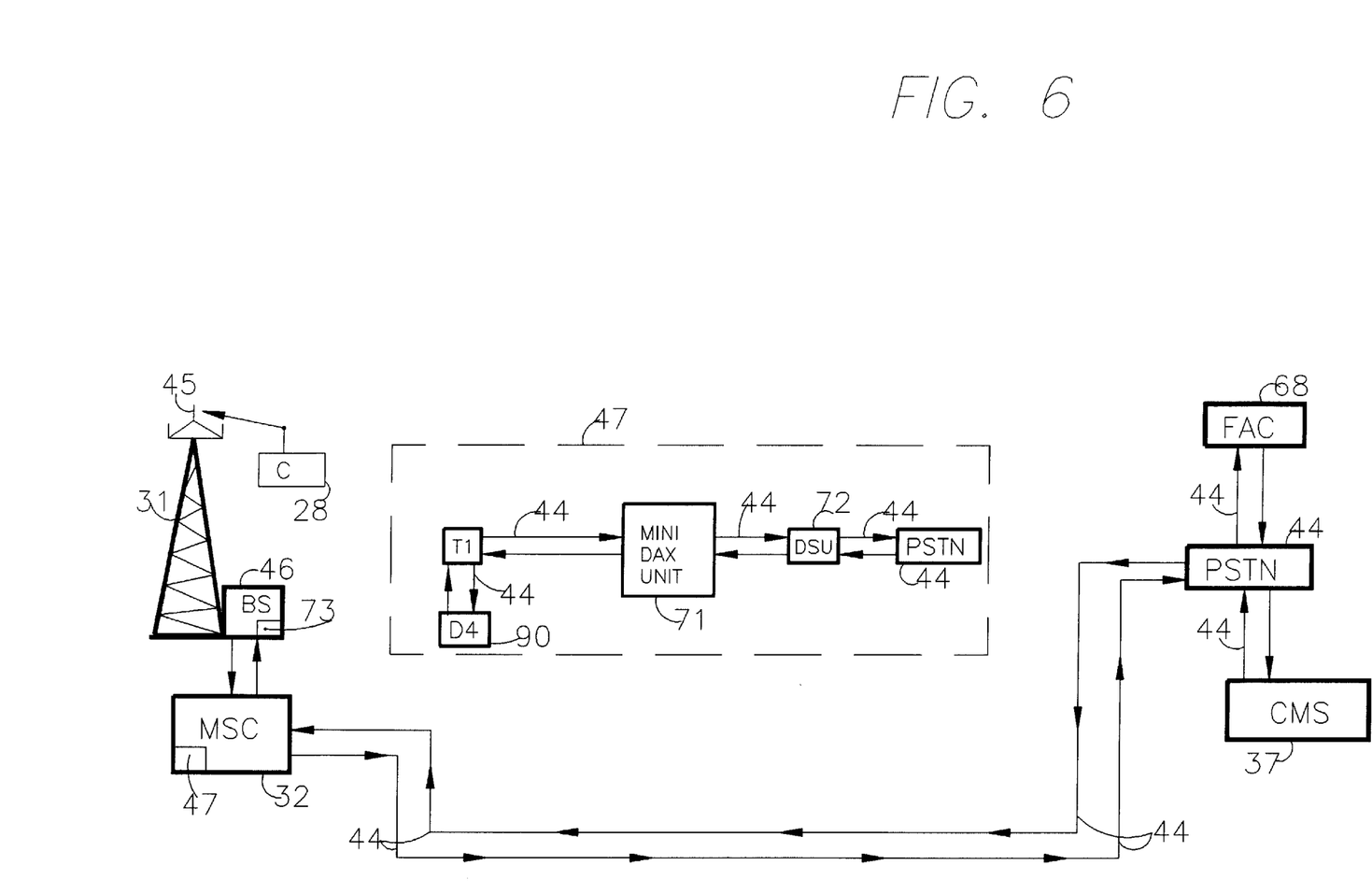
FIG. 6 is an illustration of the cellular network data management system, according to the invention.

Once the RECC multiword data string 39 arrives at the mobile switching center (MSC) 32, via the PSTN T1 44 that converges with other T1 lines within the office of data production 47 (ODP). Referring to FIG. 6, the ODP 47 is comprised of what is called man-machine-interface (MMI), that are computer terminals that handle; authentication processing, call tracing and other diagnostic programs that monitor; switching, PSTN T1 routing, and other types of operational statistics. The present invention utilizes the cellular systems multiple base site T1 line channels that, converge at the ODP 47. From the ODP each base site T1 is then routed through the switch for normal processing. The present invention utilizes its own data word detection, processing and routing system to manage and distribute the application specific data words to the the central monitoring system 37 (CMS) via the T1 PSTN 44. The CMS 37 then processes the data in the aforementioned manner and forwards said data to the application specific facilitator 68. The facilitator, be it a private security central monitoring station, a motor vehicle anti-theft and recovery monitoring service, or other similar type of monitoring service, evaluates all received data, and then chooses to act upon the status of the data. Once application specific data status is determined, then certain action command options are evaluated. The options are action or non-action. If action is necessary, the facilitator 68 transmits an action data base command request from its processing terminals back through the CMS 37 via the PSTN T1 44.

Referring to FIG. 1, the T1 modem bay 48, receives the action data base command (ADBC) request, from the facilitator 68. Then the ADBC request is then routed to the data reception and distribution terminal (DRD) 38. The DRD routes the ACDB request to the decoder terminal 40, the decoder determines that the ACDB request is from a facilitator and forwards the ACDB request to the comparative data base terminal 41. The CBD 41 checks the ACDB request, determines which facilitator the request belongs too, validates the request and and forwards the ACDB request to the action data base terminal 43. The ADB terminal 43 determines if the action command data transmission needs to be sent to a paging network or a satellite network. The ADB terminal 43 relays the action data command to the T1 modem bay 48, where the action data command is converted from the CMS 37 local area network (LAN) communications protocol into T1 DSO or D1 protocol. Once protocol conversion is completed, the action data command is sent to a paging network control center (PNCC) 29, whereby the action data command is relayed by the controller to a designated paging transmission tower 78, or a group of transmission towers. Referring to FIG. 4, the command message 51, text message 50, and pager capcode 49 is contained in one paging data string that is sent to a communicator 28. An Inmarsat P L-band satellite 52 can be utilized to transmit an action command message to a communicator so equipment with an Inmarsat P, L-band satellite receiver. The communicator responds to the action command message in various ways.

Figure 3:
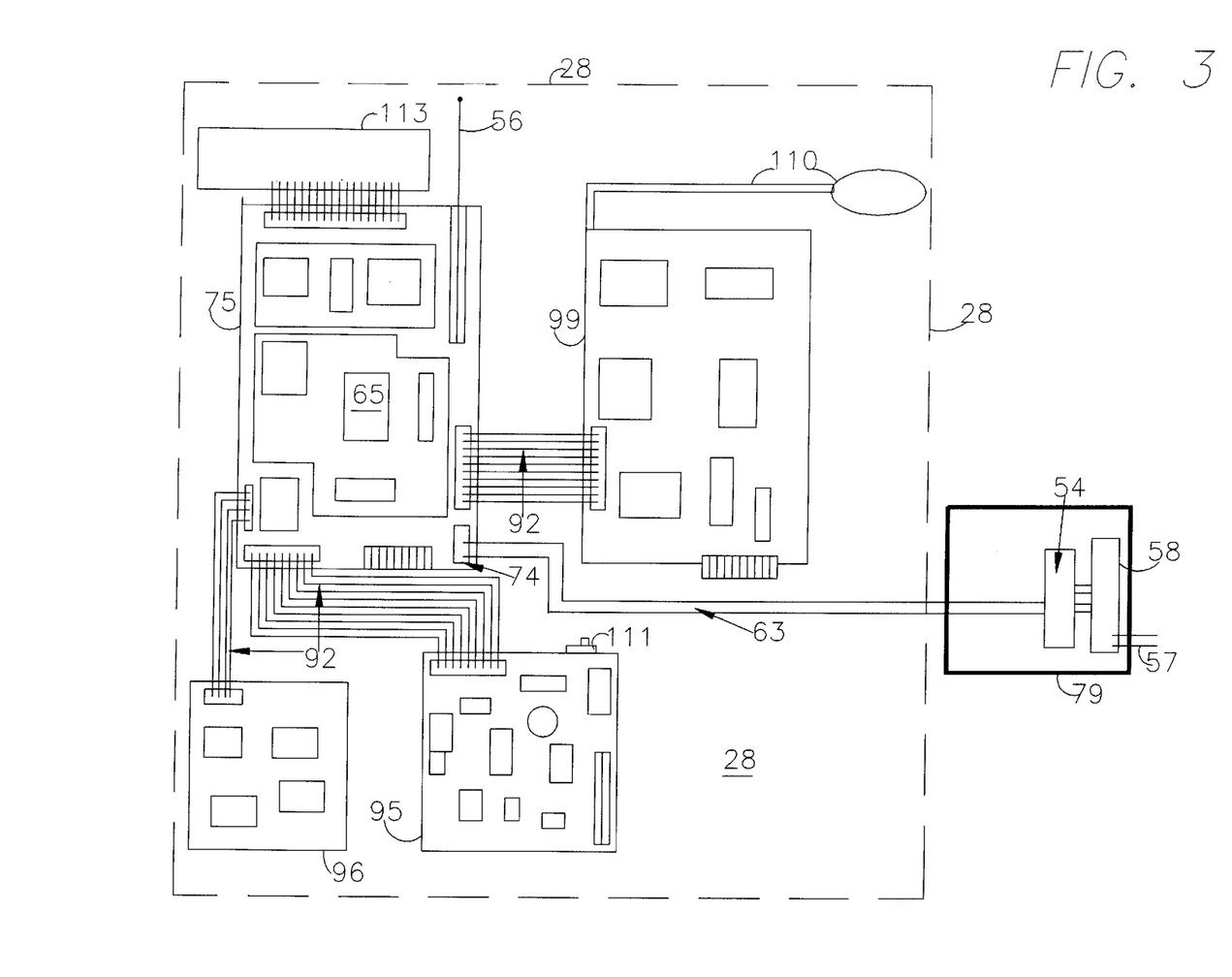
FIG. 3 is a block diagram illustrating the communications device, according to the invention.

Referring to FIG. 3, the present invention's main communicator board 75 is fully integrated with other systems; an Inmarsat P satellite receiver 96, a global positioning satellite receiver 99, and a paging receiver 95, by multipin-conductors 92. One communicator can contain all the components that will facilitate complete interaction between, cellular networks, paging networks, satellite networks and location-position networks. At the same time this same communicator configuration can be utilized for stationary applications such as security system monitoring by interfacing with off-the-shelf security panels 79, that are interfaced to security contacts that contain magnets 61, reed sensors 60, and typical copper conductors 57. The present invention communications technology makes this all possible in a highly efficient and cost effective manner.

Referring to FIGS. 2 and 3, the security panel 79 contains security system components plus the present invention communicator 28 by data transfer conductors 63. Typically in application, it will not be necessary to have a GPS receiver, and a satellite receiver and a paging receiver all combined with a cellular receiver for the purpose of monitoring stationary security systems. A combination of a cellular receiver for sending H word information to a cellular network with a paging receiver or a satellite receiver for receiving action command messages for the present invention central monitoring network. In this way the present invention provides total application specific data communication versatility, all based on existing but at present separate communication systems.

Referring to FIG. 6, the office of data production (ODP) 47 acts as a convergence point for all PSTN T1 33 channels that are sent from all the base sites that any particular cellular system control and manage. Some cellular systems manage from one to four hundred cellular towers 31 and base stations 46. At each base site there is a base site controller (BSC) 73 that contain control systems that convert air-interface protocols to PSTN T1 protocols by channel bank data D4 90 processing cards designed especially for these purposes.

The D4 card 90 convert control channel data packet protocols and voice channel air interface protocols into PSTN T1 protocols and then transmit these protocols to the MSC 32. The office of data production (ODP) 47 which is located at the MSC 37, is the physical point where the present invention applies its data detection and routing means and methodology.

Referring to FIG. 5, and FIG. 6, base site controller (BSC) 73 software is modified to detect the control channel data multi-word string 39 that contains the A word 86, the B word 98, the C word 53 and the H word 69. The software "looks" at the first word which is the A word that contains various information fields. One field is the station class mark (SCM) 108, a four-bit field that indicates what type of mobile station or communicator that sent a particular string into the cellular system. All CCAD communicators have a special station class mark, that distinguishes the CCAD class of station from all other mobile and stationary communicators. Referring to FIG. 5 the descriptive word format 30 shows each information field in A through H words. The A word 86 shows the SCM field 108 equalling the decimal number eleven. This "tells" the base site controller software to route all CCAD communicator data multi-word strings to a designated T1 DS-O channel on the PSTN T1 line. To ensure definite CCAD multi-word string identification, base site controller software also scans the C word 53 electronic serial number (ESN) 76 for a distinctive pattern that further identifies a multi-word string belonging to the present invention's CCAD communicator. Other pertinent identification fields that can be used by the present invention are the mobile identification number fields 83 that exist both the A word 86, and B word 98. The order code 102 and order qualifier code 101 are used to "tell" the base site controller accept the CCAD application specific multi-word data string, and not cause a voice channel to be seized and utilized. The present invention "fools" the base site to "think" that the CCAD multi-word string is an autonomous registration action, while in fact the string is an application specific multi-word string that contains the H word. The number of additional words coming NAWC field 100 "forces" the base site controller to accept all four words of the autonomous registration string that normally includes the A word 86, the B word 98 and the C word 53. The H word 69 is an additional application specific word that contains communicator and attached system status bit fields. In this unique way the present invention provides a means for causing a new use of the cellular control channel processes while in no way creating a data environment that disrupts normal cellular system traffic processing.

From each base site the CCAD multi-word string is assigned the same DS-O channel. Referring to FIG. 6, when each designated DS-O digital data channel information slot reaches the PSTN T1 convergence point, it is routed by the mini dax T1 channel routing unit 71, to a data switch unit 72, and then each DS-O is sent to the CMS 37 via the PSTN T1 44. Where it is processed in the aforementioned manner.

The present invention can also utilize a hardware and software solution at the base station in order to detect and route CCAD application specific multi-word data strings. There are many ways to accomplish the aforementioned processes.

Additional advantages, modifications, and implementations will readily occur to those skilled in the art. The invention in its broader aspects is, therefore, not limited to the specific details, representative apparatus, methodology, and illustrative examples shown and described. For example, the method and apparatus of the present invention are useful in various systems including the Nextell System, RAM, ARDIS, cellular digital packet data (CDPD), Global Special Mobile (GSM) or standard European cellular formats, Home Location Register (HLR), Visitor Location Register (VLR), and the like. Accordingly, departures may be made from such details without departing from the spirit or scope of the applicant's general inventive concept.

What is claimed is:

1. A method for communicating messages from a communicator over a cellular telephone network that includes a voice channel, a reverse control channel and a forward control channel wherein the voice channel conveys data and the reverse and forward control channels convey control signals that manage access to and use of the voice channel, the method comprising the steps of:
   a) encoding at the communicator a message comprising data related to a specific application to create an encoded message for transmission over the reverse control channel as control signals, including the step of manipulating an autonomous registration reverse control channel message at the communicator to create a manipulated autonomous registration reverse control channel message that includes the message; and
   b) transmitting the encoded message from the communicator over the reverse control channel as control signals, bypassing the voice channel.

2. The method of claim 1, further comprising an initial step of transmitting the message comprising data related to a specific application from a remote monitoring device to the communicator.

3. The method of claim 2, wherein the remote monitoring device comprises a security system, and the step of transmitting the message comprising data related to a specific application from the remote monitoring device to the communicator includes transmitting the message comprising data related to a status of the security system from the security system to the communicator.

4. The method of claim 2, wherein the remote monitoring device comprises a tracking system, and the step of transmitting the message comprising data related to a specific application from the remote monitoring device to the communicator includes transmitting the message comprising tracking data from the tracking system to the communicator.

5. The method of claim 2, further comprising the steps of:
   receiving at a central monitoring station the encoded message transmitted from the communicator over the reverse control channel; and
   decoding the encoded message to extract the message transmitted by the remote monitoring device.

6. The method of claim 1, wherein the step of transmitting the encoded message comprises transmitting the manipulated autonomous registration reverse control channel message.

7. The method of claim 6, wherein the step of decoding the encoded message to extract the message transmitted by the remote monitoring device comprises decoding the manipulated autonomous registration reverse control channel message to extract the message.

8. In a wireless data communications network that includes a paging network, a voice channel for transmitting voice data, a reverse control channel and a forward control channel for transmitting control data that controls access to and use of the voice channel, a method for transmitting messages between a central monitoring station and a remote device coupled to a communicator, comprising the steps of:
   a) encoding at the communicator a message comprising data related to a specific application to create an encoded message for transmission over the reverse control channel as control signals, including the step of manipulating an autonomous registration reverse control channel message at the communicator to create a manipulated autonomous registration reverse control channel message that includes the message; and
   b) transmitting the encoded message from the communicator over the reverse control channel as control signals, bypassing the voice channel;
   c) receiving at a central monitoring station the encoded message transmitted from the communicator over the reverse control channel; and
   d) decoding the encoded message to extract the message transmitted by the remote monitoring device;
   e) encoding at the central monitoring station a return message comprising data related to a specific application to create an encoded return message for transmission over the paging channel to the communicator; and
   f) transmitting the encoded return message from the central monitoring station over the paging network to the communicator.

9. the method of claim 8, further comprising the step of transmitting the return message comprising data related to a specific application from an application specific central monitoring system to the central monitoring station.

10. The method of claim 9, wherein the step of transmitting the return message comprising data related to a specific application from an application specific central monitoring station to the central monitoring station includes the step of transmitting the return message comprising data related to a request for status of a remote security system from a security system central monitoring station to the central monitoring station.

11. The method of claim 9, wherein the step of transmitting the return message comprising data related to a specific application from an application specific central monitoring station to the central monitoring station includes the step of transmitting the return message comprising data related to a request for a location of a remote object from a tracking system central monitoring station to the central monitoring station.

12. The method of claim 8, further comprising the steps of:
   a) receiving at the communicator the encoded return message transmitted from the central monitoring system over the paging network;
   b) decoding at the communicator the encoded return message to extract the message; and
   c) transmitting the return message from the communicator to the remote device.

13. A communicator transmitting messages to a central monitoring station over a cellular telephone network that includes a voice channel and a control channel wherein the voice channel conveys data and the control channel conveys control signals that manage access to and use of the voice channel, and receiving messages from the central monitoring station over a paging network, the communicator comprising:

an interface coupled to a remote data source to receive a message from the remote data source, the message comprising information related to a specific application; and an encoder circuit coupled to the interface that encodes the message received from the remote data source to create an encoded message for transmission to the central monitoring station over the control channel as control signals;

a transmitter coupled to the encoder circuit that transmits the encoded message to the central monitoring station over the control channel as control signals, bypassing the voice channel;

a receiver that receives an encoded return message from the central monitoring station over the paging network; and a decoder circuit coupled to the receiver and to the interface circuit that decodes the encoded return message received from the central monitoring station over the paging network.

* * * * *